United States Patent
Wang et al.

(10) Patent No.: US 11,811,469 B2
(45) Date of Patent: Nov. 7, 2023

(54) HYBRID MIMO OVER MULTIPLE MULTI-ANTENNA SATELLITES

(71) Applicant: NOKIA SOLUTIONS AND NETWORKS OY, Espoo (FI)

(72) Inventors: Jerry Wang, Marlboro, NJ (US); Heiko Straulino, Eurasburg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/108,818

(22) Filed: Feb. 13, 2023

(65) Prior Publication Data

US 2023/0261701 A1  Aug. 17, 2023

(30) Foreign Application Priority Data

Feb. 16, 2022  (FI) .................................. 20225136

(51) Int. Cl.
| | | |
|---|---|---|
| H04B 7/04 | (2017.01) | |
| H04B 7/0413 | (2017.01) | |
| H01Q 21/28 | (2006.01) | |

(52) U.S. Cl.
CPC .......... *H04B 7/0413* (2013.01); *H01Q 21/28* (2013.01)

(58) Field of Classification Search
CPC ......... H04B 7/0413; H04B 7/02; H04B 7/10; H01Q 21/28
USPC ................................ 375/211, 262, 267, 299
See application file for complete search history.

(56) References Cited

U.S. PATENT DOCUMENTS

| | | | |
|---|---|---|---|
| 8,346,162 | B1 | 1/2013 | Jayasimha et al. |
| 8,780,788 | B2 * | 7/2014 | Peach .................. G01S 5/0018 |
| | | | 725/19 |
| 2003/0068978 | A1 | 4/2003 | Karabinis et al. |
| 2006/0211419 | A1* | 9/2006 | Karabinis ............ H04B 7/2041 |
| | | | 455/12.1 |
| 2009/0034448 | A1 | 2/2009 | Miller et al. |
| 2009/0137203 | A1* | 5/2009 | Karabinis .......... H04B 7/18515 |
| | | | 455/12.1 |
| 2015/0087299 | A1* | 3/2015 | Veysoglu ............ H04B 7/2041 |
| | | | 455/552.1 |
| 2017/0041066 | A1* | 2/2017 | Chu .................... H04B 7/18502 |
| 2018/0337723 | A1 | 11/2018 | Arnaud et al. |
| 2019/0007110 | A1 | 1/2019 | Gulbay et al. |
| 2019/0123811 | A1 | 4/2019 | Potter et al. |

(Continued)

FOREIGN PATENT DOCUMENTS

| | | |
|---|---|---|
| JP | S63 246038 A | 10/1988 |
| WO | 2017/195183 A1 | 11/2017 |

(Continued)

OTHER PUBLICATIONS

Office Action dated Jul. 22, 2022 corresponding to Finnish Patent Application No. 20225136.

(Continued)

*Primary Examiner* — Emmanuel Bayard
(74) *Attorney, Agent, or Firm* — SQUIRE PATTON BOGGS (US) LLP

(57) ABSTRACT

Method comprising receiving, by a first antenna, a first signal, and receiving, by a second antenna, a second signal. A feeder signal is forwarded to a base station, wherein the feeder signal is based on the first signal and the second signal. A polarization angle of the second antenna is different from a polarization angle of the first antenna.

8 Claims, 7 Drawing Sheets

(56) References Cited

U.S. PATENT DOCUMENTS

| | | |
|---|---|---|
| 2019/0296802 A1 | 9/2019 | Fang |
| 2020/0412440 A1 | 12/2020 | Jayasimha et al. |
| 2021/0021331 A1 | 1/2021 | Wyler et al. |
| 2021/0242935 A1 | 8/2021 | Sakhnini et al. |
| 2022/0255619 A1* | 8/2022 | Yu .................... H04B 7/1853 |

FOREIGN PATENT DOCUMENTS

| | | | |
|---|---|---|---|
| WO | 2021/030046 A1 | 2/2021 | |
| WO | WO-2021030046 A1 * | 2/2021 | ............... H04B 7/01 |

OTHER PUBLICATIONS

Finnish Search Report dated Jul. 22, 2022 corresponding to Finnish Patent Application No. 20225136.
Communication of Acceptance—section 29 a of Patents Decree dated Dec. 7, 2022 corresponding to Finnish Patent Application No. 20225136.
Ruoqi Deng et al., "How Capacity is Influenced by Ultra-dense LEO Topology in Multi-terminal Satellite Systems?" IEEE, Abstract, Jun. 19, 2020.
Extended European Search Report issued in corresponding European Patent Application No. 23153877.8 dated Jun. 23, 2023.

\* cited by examiner

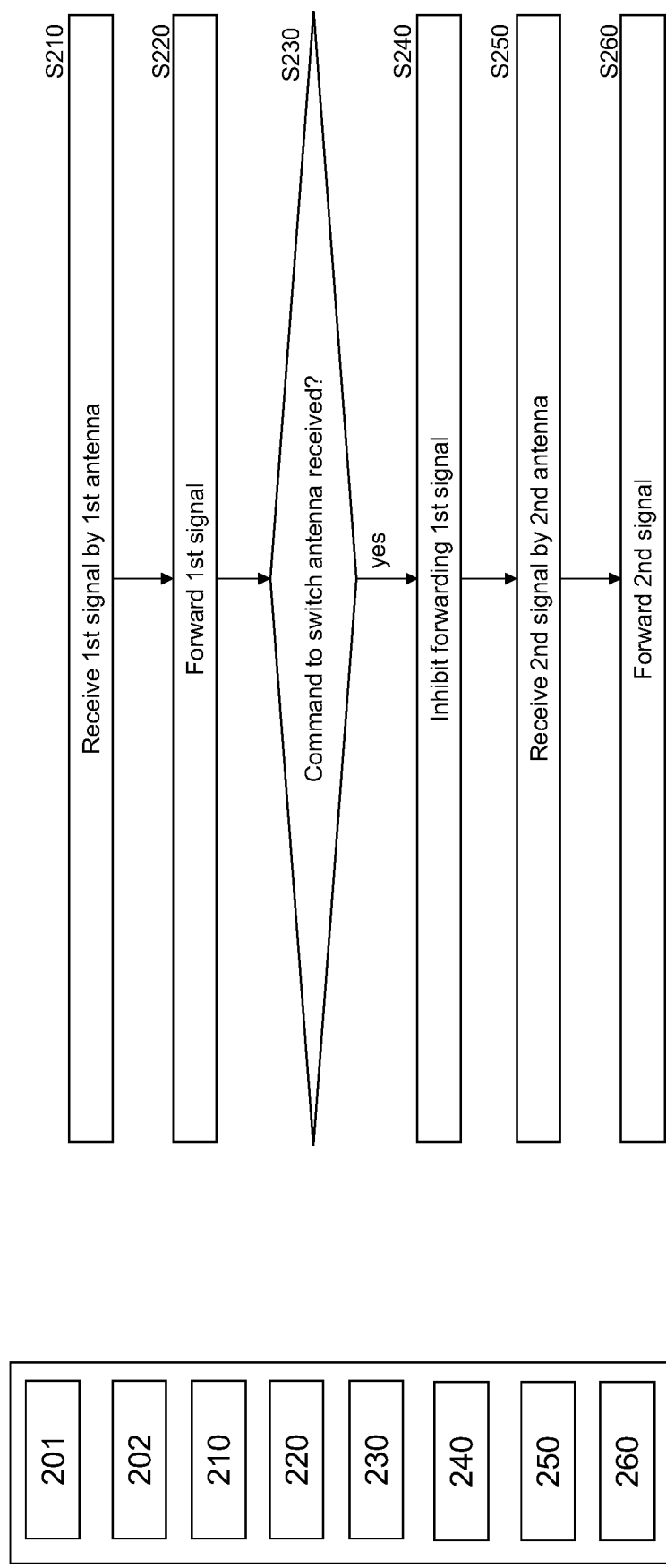

HYBRID MIMO OVER MULTIPLE MULTI-ANTENNA SATELLITES

CROSS REFERENCE TO RELATED APPLICATION

This application claims the benefit of Finnish Patent Application No. 20225136, filed Feb. 16, 2022. The entire content of the above-referenced application is hereby incorporated by reference.

FIELD OF THE INVENTION

The present disclosure relates to providing communication services via non-terrestrial networks.

Abbreviations

3GPP 3$^{rd}$ Generation Partnership Project
5G/6G/7G 5$^{th}$/6$^{th}$/7$^{th}$ Generation
CQI Channel Quality Indicator
CU Central Unit
DDC Digital Down Conversion
DL Downlink
DMRS Demodulation Reference Signal
DU Distributed Unit
IoT Internet of Things
L1/L2 Layer 1 (PHY)/Layer 2 (MAC)
LTE Long-term Evolution
MAC Medium Access Control
MCS Modulation and Coding Scheme
MIMO Multiple-Input and Multiple-Output
MRC Maximum Ratio Combining
NR New Radio
NT Network Termination
NTN Non-Terrestrial Network
PHY Physical Layer
PRB Physical Resource Block
RF Radio Frequency
RU Radio Unit
SNR Signal over Noise Ratio
SRS Sounding Reference Signal
TA Timing Advance
TM Transmission Mode
TN Terrestrial Network
UE User Equipment
UL Uplink

BACKGROUND

In Rel-17 and Rel-18, 3GPP defines extensions to its New Radio (NR) and LTE IoT standards to optimize usage for NTNs. In addition, several companies are building NTN solutions based on earlier 3GPP standards without specific NTN extensions.

In the so called "transparent payload architecture", the non-terrestrial platform (satellite) acts as an analogue RF repeater for RF signals generated by base stations (e.g. gNB or eNB) and terminals (e.g. UE) located on the ground. The non-terrestrial platform receives the NR-Uu signal via a feeder link and forwards it after frequency conversion/amplification via the service link to the terminal and vice versa.

Due to the high distance between the terminal and the non-terrestrial platform (e.g. 500-1500 km for low earth orbit satellites), NTNs typically have to cope with a challenging link budget, which results in low achievable data rates. A good way to improve the reliability of transmissions and/or achievable data rates well known from terrestrial networks is to utilize multi-antenna transmission and reception. Application of multi-antenna in NTNs is described, for example, in WO 2021/030046 A1 "Satellite MIMO system".

In the transparent payload architecture, the digital processing for multiple antenna streams is done by the base station located on the ground. Prerequisite for multi-antenna processing is accurate time synchronisation between the antenna streams. Due to the large and variable distance between the base station and the non-terrestrial platform, accurate time synchronization is difficult to achieve in NTNs, especially when the antenna streams are sent/received via different non-terrestrial platforms. An antenna stream contains the sampled signal transmitted/received by a single beam on the satellite. A single beam may be formed by multiple antenna elements.

Some space mobile systems are designed to be compatible with existing UEs (mobile phones) on 3GPP LTE and 5G New Radio standard. However, a satellite distance to a UE can be up to 1500 km, which is more than 20 times longer than a maximum eNB/gNB to UE distance in a terrestrial LTE/5G NT system. It is a big challenge to maintain a high performance with the existing UE (phones) without increasing the UE power.

WO 2021/030046 A1 describes a "Satellite MIMO system" using multiple beams from a single satellite and/or multiple distributed satellites. US 2020/412440 A1 describes a system for transmission/reception via multiple satellites that is using a selector/diversity combiner, e.g. to mitigate scintillation.

SUMMARY

It is an object of the present invention to improve the prior art.

According to a first aspect of the invention, there is provided an apparatus comprising:
a first antenna,
a second antenna, wherein a polarization angle of the second antenna is different from a polarization angle of the first antenna;
one or more processors, and memory storing instructions that, when executed by the one or more processors, cause the apparatus to perform:
receiving, by the first antenna, a first signal;
receiving, by the second antenna, a second signal;
forwarding a feeder signal to a base station, wherein the feeder signal is based on the first signal and the second signal.

The feeder signal may comprise the first signal and the second signal.

The instructions, when executed by the one or more processors, may further cause the apparatus to perform:
combining the first signal and the second signal into a single signal; wherein the feeder signal comprises the single signal.

The feeder signal may not comprise the first signal received by the first antenna; and/or the feeder signal may not comprise the second signal received by the second antenna.

According to a second aspect of the invention, there is provided an apparatus comprising:
a first antenna,
a second antenna, wherein a polarization angle of the second antenna is different from a polarization angle of the first antenna;

one or more processors, and memory storing instructions that, when executed by the one or more processors, cause the apparatus to perform:
  receiving, by the first antenna, a first signal;
  forwarding the first signal to a base station;
  monitoring whether a command to switch to the second antenna is received from the base station;
  inhibiting the forwarding of the first signal if the command is received;
  receiving, by the second antenna, a second signal;
  forwarding the second signal to the base station if the command is received.

According to a third aspect of the antenna, there is provided an apparatus comprising:
  one or more processors, and memory storing instructions that, when executed by the one or more processors, cause the apparatus to perform:
  receiving, from a first satellite, a first feeder signal;
  receiving, from a second satellite different from the first satellite, a second feeder signal;
  combining a first combined signal and a second combined signal by MIMO processing, wherein
  the first feeder signal comprises an indication that the first feeder signal is based on a third signal from a terminal;
  the second feeder signal comprises an indication that the second feeder signal is based on a fourth signal from the terminal;
  the first combined signal is based on the first feeder signal;
  the second combined signal is based on the second feeder signal.

The first feeder signal may comprise the third signal and a fifth signal;
  the second feeder signal may comprise the fourth signal and a sixth signal;
  the fifth signal may comprise an indication that the fifth signal is from the terminal;
  the sixth signal may comprise an indication that the sixth signal is from the terminal;
  the instructions, when executed by the one or more processors, may further cause the apparatus to perform at least one of:
  combining the third signal and the fifth signal to obtain the first combined signal; and
  combining the fourth signal and the sixth signal to obtain the second combined signal.

The first combined signal may comprise the first feeder signal; and/or
  the second combined signal may comprise the second feeder signal.

The first combined signal may consist of the first feeder signal; and
  the second combined signal may consist of the second feeder signal.

The instructions, when executed by the one or more processors, may further cause the apparatus to perform at least one of:
  monitoring whether a quality of the first feeder signal is better than a threshold together with
  instructing the first satellite to switch reception of the first feeder signal to another antenna if the quality of the first feeder signal is not better than the threshold; and
  monitoring whether a quality of the second feeder signal is better than the threshold together with
  instructing the second satellite to switch reception of the second feeder signal to another antenna if the quality of the second feeder signal is not better than the threshold.

According to a fourth aspect of the invention, there is provided a method comprising:
  receiving, by a first antenna, a first signal;
  receiving, by a second antenna, a second signal;
  forwarding a feeder signal to a base station, wherein the feeder signal is based on the first signal and the second signal, wherein
  a polarization angle of the second antenna is different from a polarization angle of the first antenna.

The feeder signal may comprise the first signal and the second signal.

The method may further comprise:
  combining the first signal and the second signal into a single signal; wherein the feeder signal may comprise the single signal.

The feeder signal may not comprise the first signal received by the first antenna; and/or
  the feeder signal may not comprise the second signal received by the second antenna.

According to a fifth aspect of the invention, there is provided a method comprising:
  receiving, by a first antenna, a first signal;
  forwarding the first signal to a base station;
  monitoring whether a command to switch to a second antenna is received from the base station;
  inhibiting the forwarding of the first signal if the command is received;
  receiving, by the second antenna, a second signal;
  forwarding the second signal to the base station if the command is received, wherein
  a polarization angle of the second antenna is different from a polarization angle of the first antenna.

According to a sixth aspect of the invention, there is provided a method comprising:
  receiving, from a first satellite, a first feeder signal;
  receiving, from a second satellite different from the first satellite, a second feeder signal;
  combining a first combined signal and a second combined signal by MIMO processing, wherein
  the first feeder signal comprises an indication that the first feeder signal is based on a third signal from a terminal;
  the second feeder signal comprises an indication that the second feeder signal is based on a fourth signal from the terminal;
  the first combined signal is based on the first feeder signal;
  the second combined signal is based on the second feeder signal.

The first feeder signal may comprise the third signal and a fifth signal;
  the second feeder signal may comprise the fourth signal and a sixth signal;
  the fifth signal may comprises an indication that the fifth signal is from the terminal;
  the sixth signal may comprise an indication that the sixth signal is from the terminal;
  the method may comprise at least one of:
  combining the third signal and the fifth signal to obtain the first combined signal; and
  combining the fourth signal and the sixth signal to obtain the second combined signal.

The first combined signal may comprise the first feeder signal; and/or
  the second combined signal may comprise the second feeder signal.

The first combined signal may consist of the first feeder signal; and the second combined signal may consist of the second feeder signal.

The method may further comprise at least one of:

monitoring whether a quality of the first feeder signal is better than a threshold together with instructing the first satellite to switch reception of the first feeder signal to another antenna if the quality of the first feeder signal is not better than the threshold; and monitoring whether a quality of the second feeder signal is better than the threshold together with instructing the second satellite to switch reception of the second feeder signal to another antenna if the quality of the second feeder signal is not better than the threshold.

Each of the methods of the fourth to sixth aspects may be a method of satellite communication.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:

Perform multi-antenna processing in base stations where the individual antenna streams have high and variable differential delay.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 7 shows an apparatus according to an example embodiment of the invention.

FIG. 8 shows a method according to an example embodiment of the invention;

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some example embodiments provide solutions to perform multi-antenna processing in base stations where the individual antenna streams have high and variable differential delay. More in detail, some example embodiments of this invention provide a hybrid MIMO solution: MIMO over multiple satellites, where each satellite is designed to have multiple antennas per cell for multi-antenna diversity. The system link budget is improved by applying the multi-antenna diversity on each single satellite and MIMO over multiple satellites. The hybrid MIMO is different from conventional MIMO. It comprises 2 stages of space signal processing:

Stage 1: each satellite has multiple antennas with different (typically orthogonal) polarization angles. The output of the stage 1 is a single signal combined from the multiple antennas of the satellite. The benefit is for compensating the polarization loss and achieves the multi-antenna diversity gain.

Stage 2: MIMO is applied over each of the satellite signals generated from the stage 1. The benefit is to receive the MIMO gain.

Figure 1:
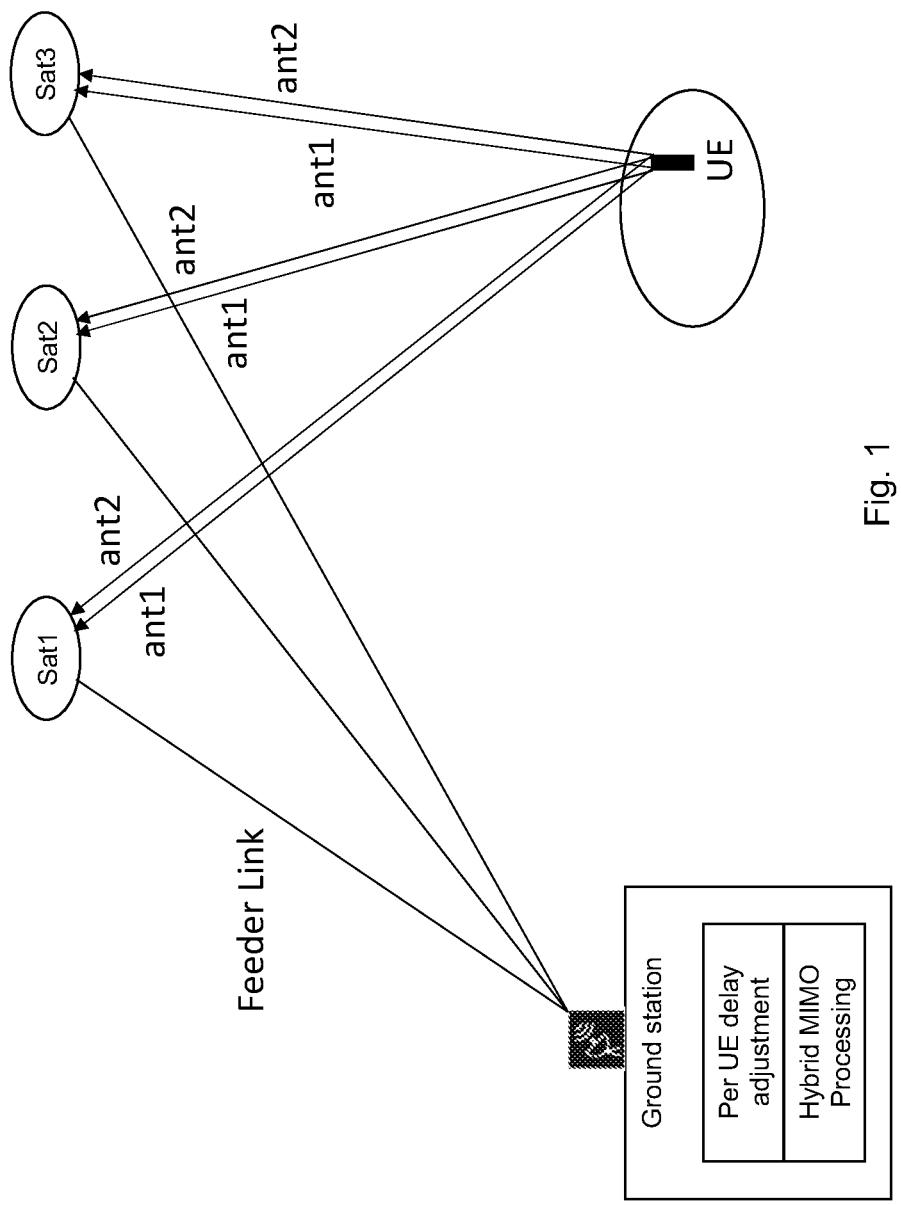
FIG. 1 illustrates UL hybrid MIMO over plural multi-antenna satellites according to an example embodiment of the invention.

FIG. 1 shows a block diagram of Hybrid MIMO over plural (in FIG. 1: three) multi-antenna satellites according to some example embodiments. In FIG. 1, a UE has plural (in FIG. 1: two) antennas with different polarization directions. Each satellite also has plural (in FIG. 1: two) antennas with different polarization directions per geographic cell. The number of antennas with different polarization directions at the UE may be the same as or different from the number of antennas with different polarization directions at each of the satellites. Different satellites may have a same number of antennas with different polarization directions or different numbers thereof. It is assumed that multiple satellites are visible over the geographic cell where the UE is located.

When a UE transmits a RF signal to the space simultaneously via its two antennas, it will be received by all antennas on all satellites. Each satellite will send its received antenna RF signal to the ground station (comprising the base station (e.g. gNB)) through feeder link. Note that, for any given UE, its PRBs and TA are configured and scheduled through only one respective satellite, known as primary satellite. The other satellites are the listening satellites for the UE signal. This configuration provides rich information for measures to enhance performance in spatial domain processing.

Figure 2:
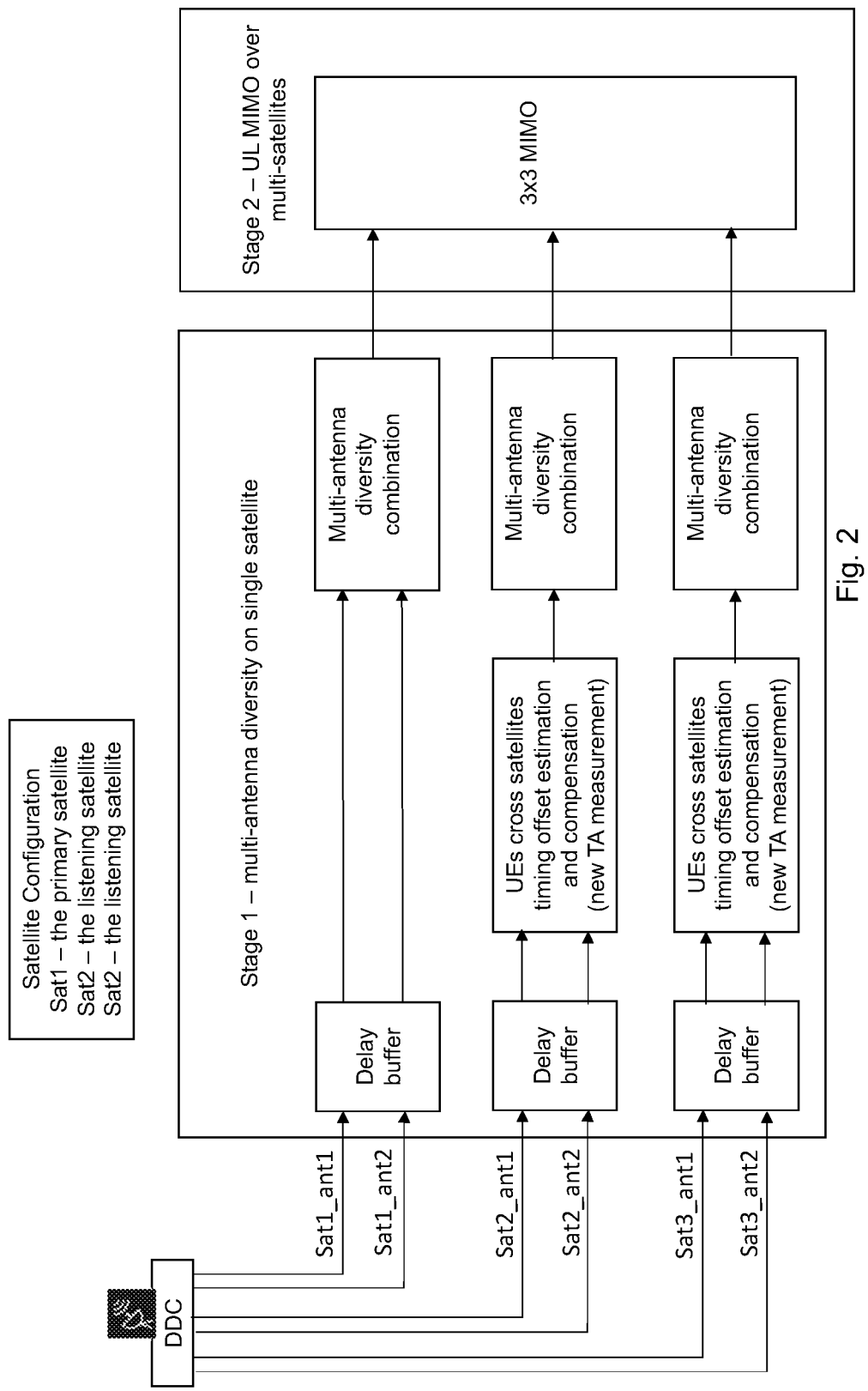
FIG. 2 illustrates method 1 of UL hybrid MIMO over plural multi-antenna satellites according to an example embodiment of the invention.
Figure 3:
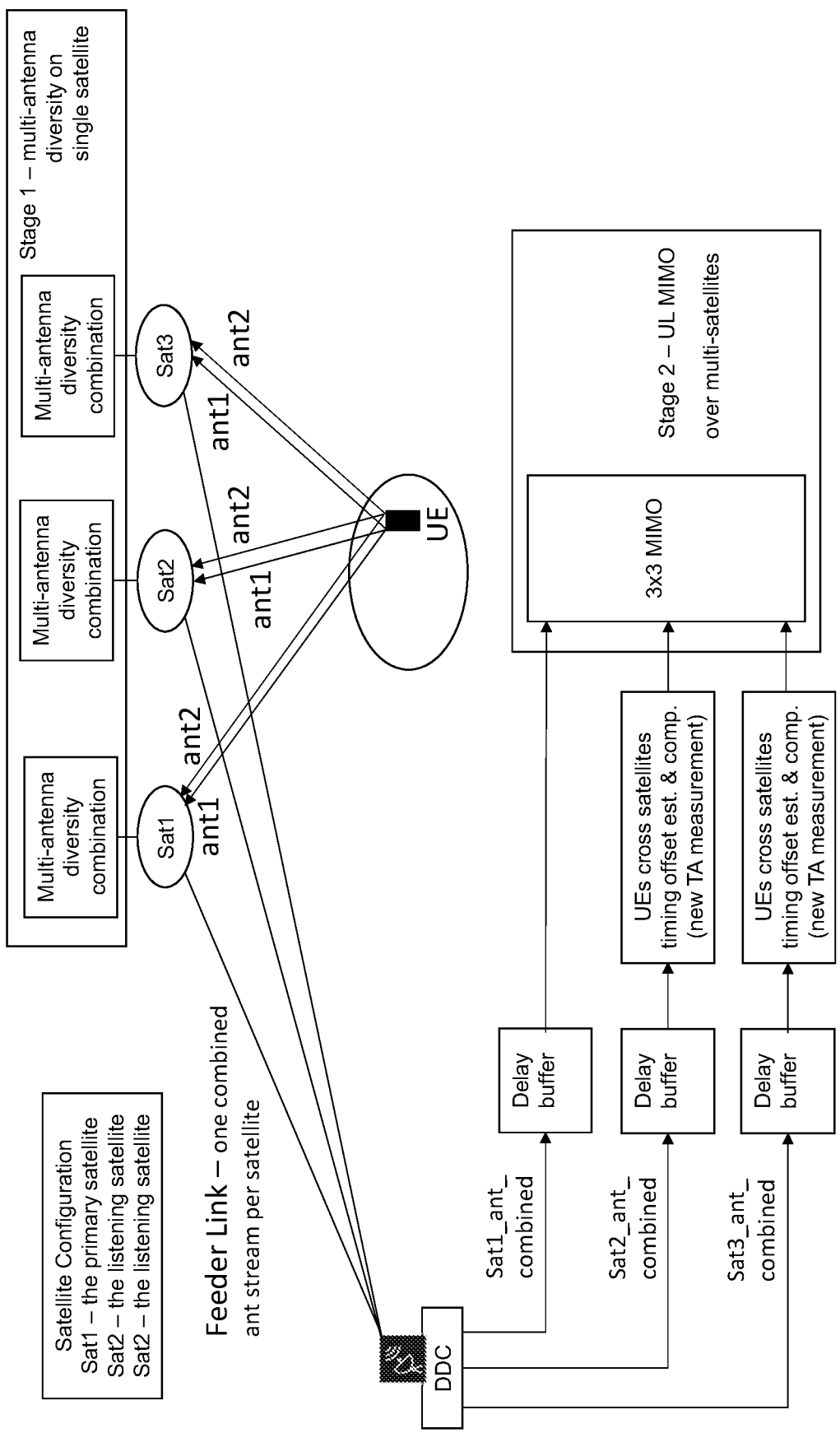
FIG. 3 illustrates method 2 of UL hybrid MIMO over plural multi-antenna satellites according to an example embodiment of the invention.
Figure 4:
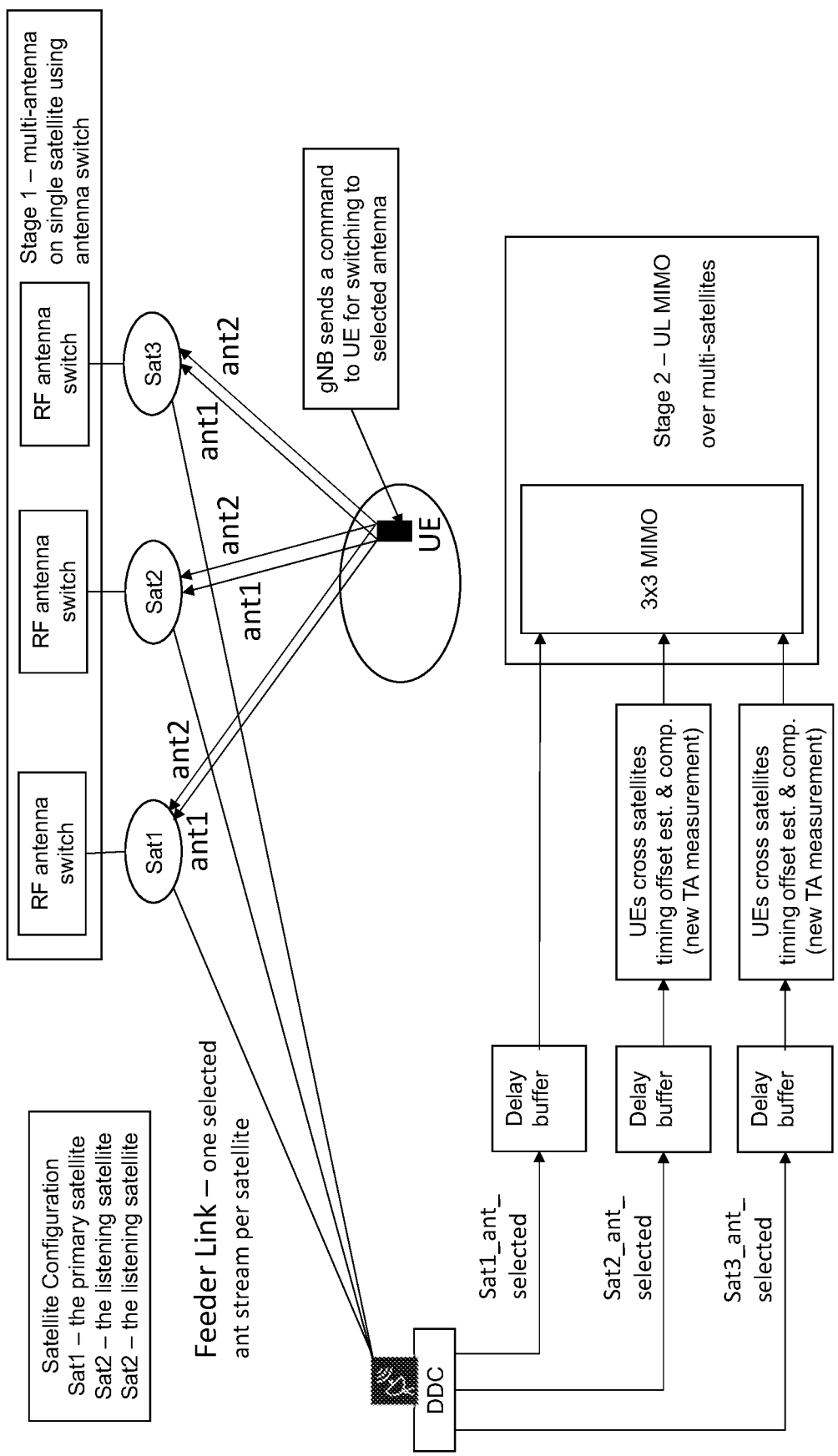
FIG. 4 illustrates method 3 of UL hybrid MIMO over plural multi-antenna satellites according to an example embodiment of the invention.

FIGS. 2 to 4 provide further details of some solutions according to example embodiments of the invention, including an explanation of the respective gNB receiver processing. The explanations are given for the signals from a single UE. If there are plural UEs, the same explanation applies correspondingly for each of the UEs.

Stage1—Multi-Antenna Diversity by Combing Multiple Antennas on a Single Satellite Method 1 (FIG. 2)

As shown in FIG. 2, antenna combining is performed on the base station (e.g. gNB): The gNB receiver receives and processes first the multiple antenna streams per satellite. The primary satellite antenna streams go to a delay buffer to synchronize to the listening satellite(s), and then go to the multi-antenna diversity combining processing unit.

According to some example embodiments of the invention, gNB schedules PRBs on the "primary satellite". On the other hand, gNB does not schedule PRBs for the UE on the (one or more) listening satellites. Thus, gNB processes the antenna streams from the (one or more) listening satellites.

In detail, the gNB may process the antenna streams from each of the listening satellite(s) as follows:
  1. Receiving antenna stream that contains PRB RF samples for the UE that are not scheduled by gNB on the listening satellite. But this UE's PRB is scheduled by gNB on primary satellite.
  2. Per listening satellite: Estimate TA for the UE to estimate the timing offset between the primary satellite and the respective listening satellite.
  3. Use the estimated TA of primary satellite and listening satellites to synchronize the timing of all the antenna streams from the primary satellite and the listening satellites, and then combine all the antenna data streams to a single antenna data stream. An example combining method is MRC (Maximum Ratio Combining) that combines all antennas using the respective SNR value as weight for each antenna's stream.

In some example embodiments, a timing misalignment between the respective antennas of one or more of the primary satellite and the listening satellite(s) may be additionally compensated. However, depending on system design, timing misalignment among the antennas of a single satellite may be skipped if all antenna sampling, sample data transportation misalignment have been already controlled inside timing tolerant range of the gNB physical layer processing. The timing misalignment of multi-antenna inside a same satellite is similar to that of a ground based TN gNB multi-antenna system, but the buffer sizes may be different because each antenna stream is sent from satellite to gNB via feeder link, and DDC will perform buffering and course timing alignment. Some conventional L1 processing unit may have only 100s ns of tolerant range. Hence, in some example embodiments of the invention, buffer size is increased to compensate larger antenna timing misalignment.

In addition to the above described processing, gNB may optionally perform noise/interference filtering, channel estimation, channel compensation, SNR estimation, etc.

The listening satellite antenna streams perform estimation and compensation processing for UE's timing offset between the primary satellite and the listening satellite(s).

When an UE transmits a RF signal, all the satellites viewing the UE will receive it, but different satellites will receive it at different times due to different distances. The timing offset is measured by TA per UE, per satellite. Since gNB only scheduled the UE on the primary satellite, no UE scheduling information is available on the listening satellites. Thus, an existing system is not able to measure the TA on the listening satellites. Some example embodiments of the invention compensate the TA of the listening satellites in the gNB which is aware of the scheduling for the UE via the primary satellite.

Then, the antenna-diversity combined signal (a kind of a "feeder signal") goes to MIMO combining processing. There are two options to perform the multi-antenna diversity combining:
  1) combining before the L1 receiver.
  2) combining inside the L1 receiver.

If the combining is inside L1 receiver (option 2), then each antenna stream needs a separated buffer before it is input into the L1 receiver. If the combining is performed before the input of L1 receiver (option 1), then only 1 buffer per satellite is needed for the multi-antenna streams.

Method 2 (FIG. 3)

As shown in FIG. 3, the antenna-diversity combining is performed on the satellite: I.e., the multiple antenna RF streams are combined on the satellite to a "feeder signal". An advantage of this configuration is as follows: In the space mobile system, the feeder link bandwidth is very limited. Multiple antennas consume multiple bandwidths on the feeder link. By performing the antenna combining (stage 1 processing) to the satellite, only a single antenna bandwidth is used on the feeder link. This can save a lot of feeder link resources which may be used to increase the cell capacity, for example.

The antenna-diversity combining may be performed at the satellite even though, for the multi-antenna on UL, a UE signal could be reflected from an object on ground (like a building etc). The signal then goes to the satellite. However, the distance between a UE to the multipath reflecting object (like a building) is normally in a few kilometer range (or even less), but the distance between the UE to the satellite could be up to 1500 km. Therefore, the multi-antenna signals of a UE received by the satellite have nearly the same angle of arrival, which means the RF signals from the multiple antennas of the UE may be directly combined. In the example of two antennas, the two antennas typically have orthogonal polarization angles. After combining, the polarization loss is significantly reduced. Combing multi-antennas on a satellite is a balance between the performance and capacity.

Namely, if antenna combining is performed on gNB (e.g. on its soft bit stage):
  Pro: each antenna can have noise/interference filtering, channel estimation, channel compensation, antennas are combined by SNR weighting etc. This will improve the performance
  Con: each antenna will consume feeder link bandwidth separately
  If antenna combining is performed on satellite:
  Pro: all antennas only consume a single antenna bandwidth on feeder link.
  Con: there is no signal processing on satellite. Antennas are combined at RF sample using the same weight (no SNR weighting etc). This will reduce performance compared to the combining at gNB (e.g. on its soft bit stage).

Each satellite then sends the antenna-diversity combined signal (a kind of a "feeder signal") to the base station, where MIMO combining is performed.

Method 3 (FIG. 4)

As shown in FIG. 4, an antenna switch may be performed on the satellite: Each satellite may be configured with multiple antennas per cell, but the antennas work in time-division multiplex mode. A RF antenna switch is implemented on the satellite. Only 1 antenna is active at a time. The procedure of antenna selection is as follows:

gNB monitors the gNB-UE link performance in real-time by respective measurements of the signal quality (e.g. by CQI reports in downlink or DMRS/SRS in uplink).

If the quality is below a threshold, then gNB instructs the satellite to switch from the currently active antenna to another antenna, which includes switching satellite antenna and/or switching UE antenna to mitigating the polarization loss for each UE; for example, gNB may instruct switching if the current link performance drops below a predefined threshold.

select an antenna that has the highest performance measurement (according to the previous measurements of link performance)

In this case, the "feeder signal" is the signal from the selected antenna. Note, each satellite antenna needs to serve for all UEs in the cell. Therefore, switch UE antenna to minimizing the polarization loss could be specific to a given UE.

Stage 2—UL MIMO Over the Multiple Satellites

The output of stage 1 will be one combined information per satellite. All the receptions from a single UE are also timing synchronized at the stage 1 output. Therefore, the stage 1 outputs of all the satellites are sent to MIMO processing unit. The MIMO processing unit may support at least one of layer 1 (LTE TM2 transmit diversity) to increase SNR and so increase MCS table data rate; and layer 2 (LTE TM4 close loop spatial multiplex) to increase data rate.

Figure 6:
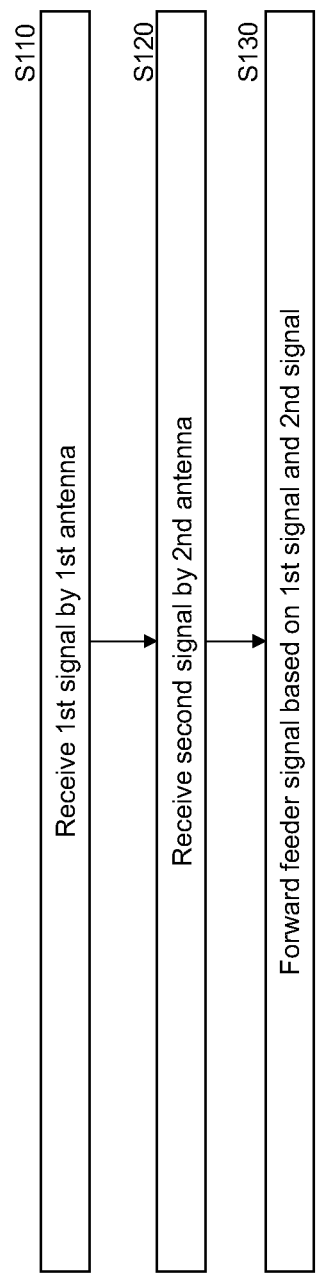
FIG. 6 shows a method according to an example embodiment of the invention.
Figure 5:
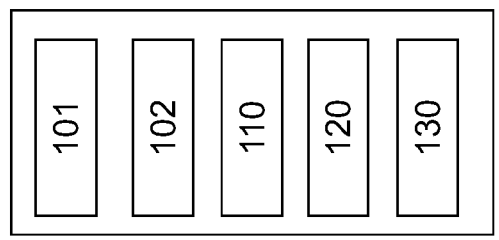
FIG. 5 shows an apparatus according to an example embodiment of the invention.

FIG. 5 shows an apparatus according to an example embodiment of the invention. The apparatus may be a satellite or an element thereof. FIG. 6 shows a method according to an example embodiment of the invention. The apparatus according to FIG. 5 may perform the method of FIG. 6 but is not limited to this method. The method of FIG. 5 may be performed by the apparatus of FIG. 6 but is not limited to being performed by this apparatus.

The apparatus comprises a first antenna 101, a second antenna 102, first means for receiving 110, second means for receiving 120, and means for forwarding 130. The first means for receiving 110, second means for receiving 120, and means for forwarding 130 may be a first receiving means, second receiving means, and forwarding means, respectively. The first means for receiving 110, second means for receiving 120, and means for forwarding 130 may be a first receiver, second receiver, and forwarder, respectively. The first means for receiving 110, second means for receiving 120, and means for forwarding 130 may be a first receiving processor, second receiving processor, and forwarding processor, respectively.

A polarization angle of the second antenna 102 is different from a polarization angle of the first antenna 101.

The first means for receiving 110 receives, by the first antenna, a first signal (S110). The second means for receiving 120 receives, by the second antenna, a second signal (S120). Both the first signal and the second signal may be from a terminal. The means for forwarding 130 forwards a feeder signal to a base station (S130). The feeder signal is based on the first signal of S110 and the second signal of S120. For example, the feeder signal may comprise both the first signal and the second signal, or the feeder signal may be generated by combining the first signal and the second signal.

FIG. 7 shows an apparatus according to an example embodiment of the invention. The apparatus may be a satellite or an element thereof. FIG. 8 shows a method according to an example embodiment of the invention. The apparatus according to FIG. 7 may perform the method of FIG. 8 but is not limited to this method. The method of FIG. 7 may be performed by the apparatus of FIG. 8 but is not limited to being performed by this apparatus.

The apparatus comprises a first antenna 201, a second antenna 202, first means for receiving 210, first means for forwarding 220, means for monitoring 230, means for inhibiting 240, second means for receiving 250, and second means for forwarding 260. The first means for receiving 210, first means for forwarding 220, means for monitoring 230, means for inhibiting 240, second means for receiving 250, and second means for forwarding 260 may be a first receiving means, first forwarding means, monitoring means, inhibiting means, second receiving means, and second forwarding means, respectively. The first means for receiving 210, first means for forwarding 220, means for monitoring 230, means for inhibiting 240, second means for receiving 250, and second means for forwarding 260 may be a first receiver, first forwarder, monitor, inhibiter, second receiver, and second forwarder, respectively. The first means for receiving 210, first means for forwarding 220, means for monitoring 230, means for inhibiting 240, second means for receiving 250, and second means for forwarding 260 may be a first receiving processor, first forwarding processor, monitoring processor, inhibiting processor, second receiving processor, and second forwarding processor, respectively.

A polarization angle of the second antenna 202 is different from a polarization angle of the first antenna 201.

The first means for receiving 210 receives, by the first antenna, a first signal (S210). The first means for forwarding 220 forwards the first signal to a base station (S220). In that time, forwarding of signals received by other antennas than the first antenna may be inhibited.

The means for monitoring 230 monitors whether a command to switch to the second antenna is received from the base station (S230).

The second means for receiving 250 receives, by the second antenna, a second signal (S250). S210 and S250 may be performed in an arbitrary sequence. They may be performed fully or partly in parallel.

If the command is received (S230=yes):
the means for inhibiting 240 inhibits the forwarding of the first signal (S240); and
the second means for forwarding 260 forwards the second signal to the base station (S260).

S240 and S260 may be performed in an arbitrary sequence. They may be performed fully or partly in parallel. In some example embodiments, as shown in FIG. 8, the receiving (S250) by the second receiving means 250 may be performed only if the command is received (S230=yes). However, in other example embodiments, the receiving (S250) by the second receiving means 250 may be performed regardless of whether or not the command is received (S230=yes or no).

Figure 10:
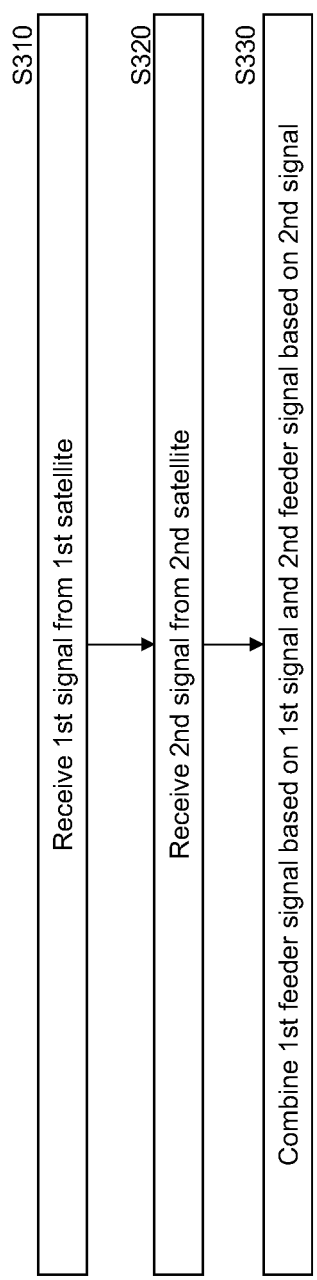
FIG. 10 shows a method according to an example embodiment of the invention.
Figure 9:
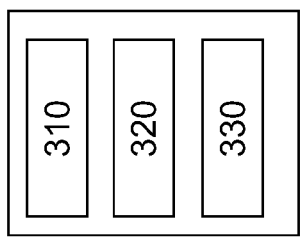
FIG. 9 shows an apparatus according to an example embodiment of the invention.

FIG. 9 shows an apparatus according to an example embodiment of the invention. The apparatus may be a base station, such as a gNB or eNB, or an element thereof. FIG. 10 shows a method according to an example embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises first means for receiving 310, second means for receiving 320, and means for combining 330. The first means for receiving 310, second means for receiving 320, and means for combining 330 may be a first receiving means, second receiving means, and combining means, respectively. The first means for receiving 310, second means for receiving 320, and means for combining 330 may be a first receiver, second receiver, and combiner, respectively. The first means for receiving 310, second means for receiving 320, and means for combining 330 may be a first receiving processor, second receiving processor, and combining processor, respectively.

The first means for receiving 310 receives, from a first satellite, a first feeder signal (S310). The first feeder signal comprises an indication that the first feeder signal is based on a third signal from a terminal. The second means for receiving 320 receives from a second satellite a second feeder signal (S320). The second feeder signal comprises an indication that the second signal is based on a fourth signal from the terminal (i.e. from the same terminal as that on which the first signal is based). The second satellite is different from the first satellite.

The means for combining 330 combines a first combined signal and a second combined signal by MIMO processing (S330). The first combined signal is based on the first feeder signal. The second combined signal is based on the second feeder signal. For example, if the respective feeder signal is an antenna diversity combined signal, the respective combined signal may be the same as the respective feeder signal. As another example, if the respective feeder signal comprises two signals from two antennas of the respective satellite, the respective combined signal is obtained by antenna-diversity combining the two signals.

Figure 11:
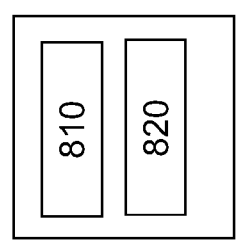
FIG. 11 shows an apparatus according to an example embodiment of the invention.

FIG. 11 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least the method according to at least one of FIGS. 6, 8, and 10 and related description.

Some example embodiments of the invention are described for NTN. However, some example embodiments may be applied to other cases where the individual antenna streams have high and variable differential delay, e.g. if the base station is mounted on a fast vehicle.

Some example embodiments are explained with respect to a 5G network. However, the invention is not limited to 5G. It may be used in other mobile communication networks using beams, too, e.g. in previous of forthcoming generations of 3GPP networks such as 4G, 6G, or 7G, etc. It may be used in non-3GPP (mobile or fixed) communication networks with a transparent payload architecture, too.

The base station (e.g. gNB) may be disaggregated into a CU, one or more DUs, and a respective RU for each of the DUs. However, the invention is not limited to disaggregated base stations. For example, RU and DU may be aggregated in a single device, or even CU, DU(s), and RU(s) may be aggregated in a single device.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a base station (such as a gNB or eNB) or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a satellite or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The phrase "at least one of A and B" comprises the options only A, only B, and both A and B. The terms "first X" and "second X" include the options that "first X" is the same as "second X" and that "first X" is different from "second X", unless otherwise specified. The term "comprises y" means "includes y and may include something else". The term "consists of z" means "includes z but does not include anything else".

The invention claimed is:

1. An apparatus, comprising:
a first antenna of a satellite;
a second antenna of the satellite, wherein a polarization angle of the second antenna is different from a polarization angle of the first antenna;
one or more processors; and
at least one memory storing instructions that, when executed by the one or more processors, cause the apparatus to perform:
receiving, by the first antenna, a first signal;
receiving, by the second antenna, a second signal;
combining the first signal and the second signal into a single signal; and
forwarding a feeder signal from the satellite to a base station, wherein the feeder signal is based on the first signal and the second signal; wherein
the feeder signal comprises the single signal, and
wherein at least one of the feeder signal does not comprise the first signal received by the first antenna, and the feeder signal does not comprise the second signal received by the second antenna.

2. An apparatus, comprising:
a first antenna;
a second antenna, wherein a polarization angle of the second antenna is different from a polarization angle of the first antenna;
one or more processors; and
at least one memory storing instructions that, when executed by the one or more processors, cause the apparatus to perform:
receiving, by the first antenna, a first signal from a user equipment;
forwarding the first signal to a base station;
monitoring whether a command to switch to the second antenna is received from the base station;
inhibiting the forwarding of the first signal if the command is received;
receiving, by the second antenna, a second signal from the user equipment; and
forwarding the second signal to the base station if the command is received.

3. An apparatus, comprising:
one or more processors; and
at least one memory storing instructions that, when executed by the one or more processors, cause the apparatus to perform:
receiving, from a first satellite, a first feeder signal;
receiving, from a second satellite different from the first satellite, a second feeder signal;
combining a first combined signal and a second combined signal by MIMO processing, wherein
the first feeder signal comprises an indication that the first feeder signal is based on a third signal from a terminal,
the second feeder signal comprises an indication that the second feeder signal is based on a fourth signal from the terminal;
the first combined signal is based on the first feeder signal, and wherein
the second combined signal is based on the second feeder signal.

4. The apparatus according to claim 3, wherein
the first feeder signal comprises the third signal and a fifth signal;
the second feeder signal comprises the fourth signal and a sixth signal;
the fifth signal comprises an indication that the fifth signal is from the terminal;
the sixth signal comprises an indication that the sixth signal is from the terminal;
the instructions, when executed by the one or more processors, further cause the apparatus to perform at least one of:
combining the third signal and the fifth signal to obtain the first combined signal; and
combining the fourth signal and the sixth signal to obtain the second combined signal.

5. The apparatus according to claim 3, wherein at least one of
the first combined signal comprises the first feeder signal; and
the second combined signal comprises the second feeder signal.

6. The apparatus according to claim 5, wherein at least one of
the first combined signal consists of the first feeder signal; and
the second combined signal consists of the second feeder signal.

7. The apparatus according to claim 5, wherein the instructions, when executed by the one or more processors, further cause the apparatus to perform at least one of:
monitoring whether a quality of the first feeder signal is better than a threshold together with
instructing the first satellite to switch reception of the first feeder signal to another antenna if the quality of the first feeder signal is not better than the threshold; and
monitoring whether a quality of the second feeder signal is better than the threshold together with
instructing the second satellite to switch reception of the second feeder signal to another antenna if the quality of the second feeder signal is not better than the threshold.

8. A method, comprising:
receiving, by a first antenna of a satellite, a first signal;
receiving, by a second antenna of the satellite, a second signal;
combining the first signal and the second signal into a single signal;
forwarding a feeder signal from the satellite to a base station, wherein the feeder signal is based on the first signal and the second signal, wherein
a polarization angle of the second antenna is different from a polarization angle of the first antenna, and wherein
the feeder signal comprises the single signal, and
wherein at least one of the feeder signal does not comprise the first signal received by the first antenna, and the feeder signal does not comprise the second signal received by the second antenna.

* * * * *